United States Patent Office 2,829,523
Patented Apr. 8, 1958

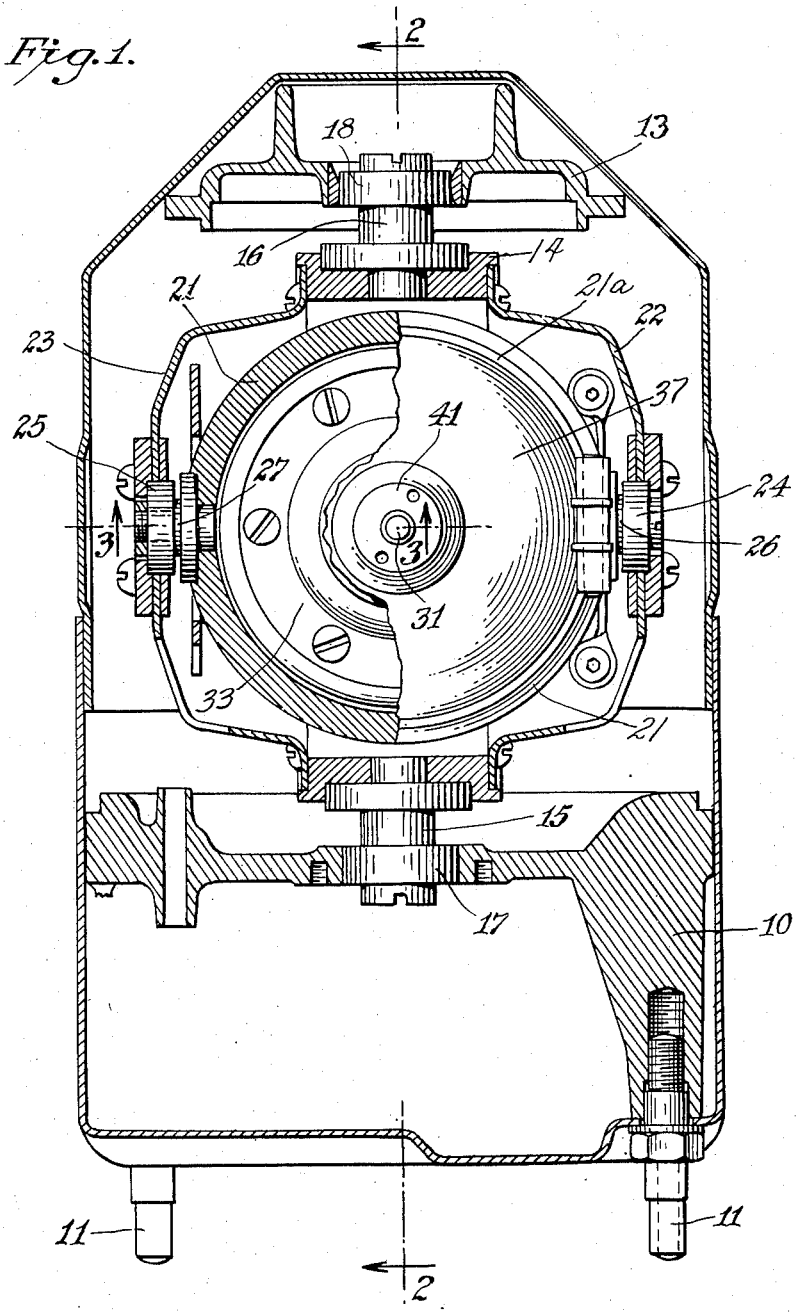

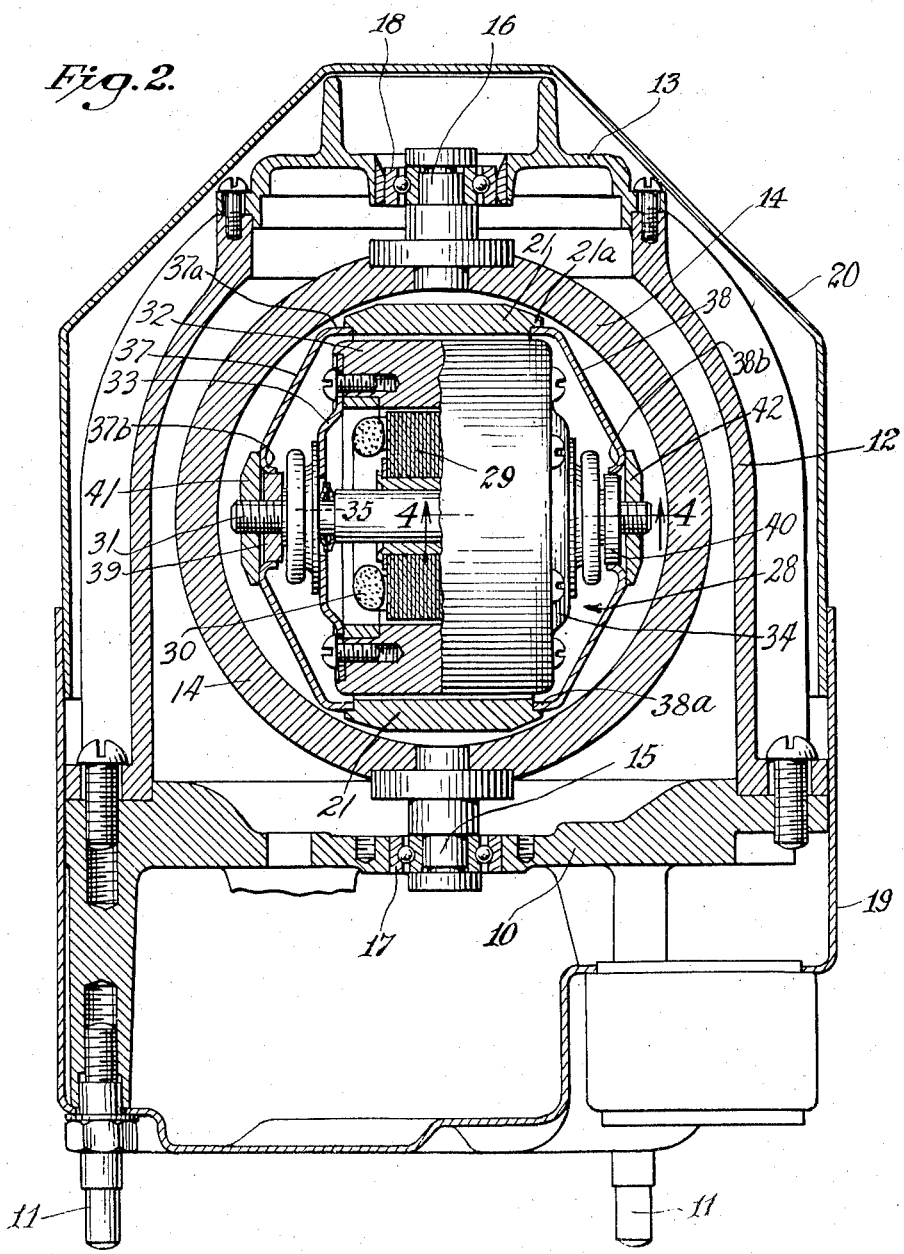

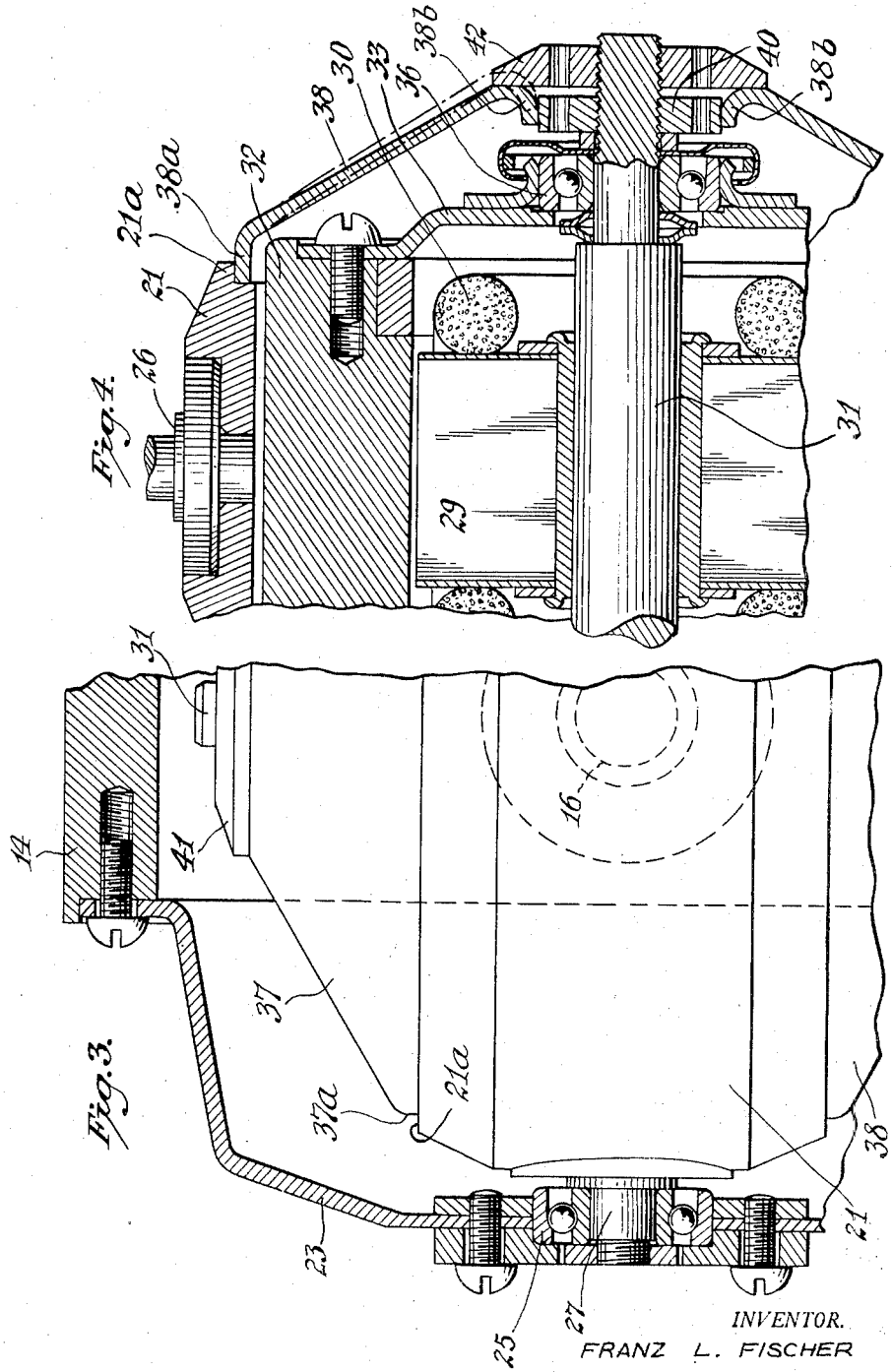

2,829,523

GYROSCOPIC INSTRUMENT

Franz L. Fischer, New York, N. Y., assignor to Bulova Research and Development Laboratories, Inc., Woodside, N. Y., a corporation of New York Application July 14, 1955, Serial No. 522,046

8 Claims. (Cl. 74—5.7)

The present invention relates generally to gyroscopes and more particularly to a gyroscopic instrument of improved mechanical rigidity adapted to operate efficiently even when subjected to severe vibratory forces.

The modern gyroscope consists essentially of an electrical gyromotor mounted to spin rapidly about an axis and also free to rotate about two axes perpendicular to each other and to the axis of spin. The spinning gyroscope offers considerable resistance to any torque tending to alter the axial direction of spin, the degree of resistance depending on the angular momentum. This torque-opposing characteristic underlies the use of a gyroscope as a stabilizer to resist the rolling of a ship or an airplane and to maintain the equilibrium thereof.

Gyroscopic instruments installed as stabilizer elements in jet-projelled missiles and similar devices are subjected to severe vibration. It is well known that free gyroscopes, when carried on such craft, are liable to drift at a high rate from their pre-set attitude. Even in a short flight of but two to three minutes duration, the deviation of the gyroscopic axis may accumulate to a large value.

Such drifting of a gyroscope under conditions of severe vibration has hitherto generally been attributed to effects in the bearings, principally in the ball-bearings. We have discovered, however, that the main cause leading to the development of torques in a constant direction as a result of alternating vibration lies in unsymmetrical distortion of the frame, gimbals and other parts of the instrument. This distortion arises from acceleration stresses which may amount to many times the force of gravity. Other factors which give rise to inefficient gyroscope operation are imbalances due to disparities in thermal expansion of the gyroscope components in response to ambient temperature changes.

In view of the foregoing, it is the chief object of the present invention to provide an efficient and reliable gyroscopic instrument whose operation is not impaired by severe vibratory forces or by marked changes in ambient temperature.

More specifically it is an object of the invention to provide a gyroscope construction of exceptional rigidity, the arrangement of the various components being in such form that, as nearly as possible, any distortion will be equal in amount for any direction in which the stress is applied.

Another object of the invention is to provide a gyroscope construction whose balance is substantially unaffected by variations in temperature caused by external conditions.

Still another object of the invention is to provide an improved gyroscope of compact and efficient design involving a minimum number of components and which may be inexpensively manufactured.

Briefly stated, in a gyroscopic instrument in accordance with the invention, a main gimbal is mounted for rotation about a first axis in the frame of the instrument and an inner gimbal is mounted for rotation in said main gimbal about a second axis perpendicular to said first axis. A gyromotor is mounted in said inner gimbal for rotation about a third axis perpendicular to said first and second axes. The instrument is characterized by the fact that the inner gimbal serves as the casing for the gyromotor and is closed at its ends by conical steel caps which support the stator of the motor, the caps being held under compression to provide the desired rigidity. All of the parts except the outer frame are fashioned of high tensile steel, the arrangement being such that the ratio of distortion to stress has a very small value in any direction. The use of a common material for the several parts has the advantage that thermal expansion is uniform and if the parts are balanced at any one temperature, the whole sensitive element will remain in poise at any other temperature.

For a better understanding of the invention as well as other objects and further features thereof, reference is had to the following detailed description to be read in conjunction with the accompanying drawing, wherein like components in the various views are identified by like reference numerals.

In the drawings:

Figure 1 is a longitudinal sectional view of a gyroscope in accordance with the invention.

Figure 2 is a sectional view taken in the plane of lines 2—2 in Figure 1.

Figure 3 is a sectional view taken in the plane of lines 3—3 in Figure 1.

Figure 4 is a sectional view taken along the plane of lines 4—4 in Figure 2.

Referring now to the drawing and more particularly to Figs. 1 and 2, the gyroscopic instrument according to the invention is mounted in a frame constituted by a base member 10, provided at the underside with a plurality of vertical legs 11, a dome-shaped cage 12 supported above base 10, and a head 13 surmounting the cage. Pivotally supported between the head 13 and the base 10 is the main or outer gimbal ring 14 which is rotatable within the cage about a vertical axis extending through the center of the instrument. Ring 14 is provided at diametrically opposed positions with trunnions 15 and 16 which are pivoted in ball-bearings 17 and 18, set in base 10 and head 13, respectively. A protective housing or shell 19 serves to encase the instrument, the shell being provided with a removable cover 20.

Pivotally supported within the main gimbal ring 14 is the inner gimbal ring 21. Inner ring 21 is rotatable about a horizontal axis intersecting the vertical axis of the instrument and perpendicular thereto. To support the inner gimbal, the ends of the main gimbal, as best seen in Figs. 1 and 3, are enclosed by steel caps 22 and 23 having ball-bearings 24 and 25, respectively, mounted centrally thereon. Projecting from diametrically opposed positions on the inner ring are trunnions 26 and 27 which are received within the respective bearings 24 and 25.

The inner gimbal ring 21 serves as the outer casing of an electric motor or gyromotor, generally designated by numeral 28, the motor being rigidly supported within the inner ring. The gyromotor is constituted by a cylindrical stator element 29 provided with a winding 30 and fixedly mounted on a central shaft 31 which extends along a horizontal axis of spin intersecting the vertical axes of the instrument and perpendicular both to said vertical axis and to the horizontal axis about which the inner gimbal is rotatable.

Concentrically surrounding stator 29 and rotatable about the shaft 31 is a solid steel tubular rotor 32 which is internally slotted in the conventional manner to carry the rotor windings. The ends of rotor tube 32 are enclosed by circular steel caps 33 and 34, the peripheral portion of the caps being rigidly secured to the ends of the tube by screws or other suitable means. Caps 33 and 34 carry the outer races of ball-bearings 35 and 36, the inner races being affixed to central shaft 31. Thus when the motor is energized, the rotor spins rapidly about the fixed shaft 31.

Inner gimbal ring 21 is concentric with the rotor tube 32 and is similarly constructed of a solid steel tube. The ends of the inner gimbal ring are enclosed by a pair of frusto-conical end caps 37 and 38 formed of pressed steel and provided with peripheral skirts 37a and 38a, received within circular ledges 21a recessed in the opposing ends of the inner ring 21. The apex portions of caps 37 and 38 are reentrant in form to provide rounded lips 37b and 38b whose inner annular wall is secured to the periphery of nuts 39 and 40, respectively. Nuts 39 and 40 are threadably received on opposing ends of central shaft 31, whereby in assembly of the instruments the caps may be readily screwed onto the ends of the shaft.

The end caps 37 and 38 are compressed between spanner nuts 41 and 42 which are threadably received on the ends of shaft 31. The inner flat surfaces of the nuts 41 and 42 engage the rounded surfaces of lips 37b and 38b to provide a compressive force having radial components in the caps 37 and 38 which tend to flatten and spread at the skirts 37a and 38a, whereby the skirts press outwardly against the ledges 21 in the inner gimbal ring. Thus when the spanner nuts 41 and 42 are threaded in against the caps 37 and 38, the caps tightly fit within the inner gimbal ring. As a consequence of this compressive assembly, the end caps 37 and 38, the shaft 31 and the inner gimbal 21 behave effectively as one rigid piece of steel which is able to withstand heavy vibratory forces.

It is important to note that all of the elements forming the gyroscope, save for the frame and the windings of the motor, are formed of high tensile steel, and that symmetry and balance are maintained throughout the structure. This equilibrium is held even under marked changes in temperature since the various elements have the same thermal coefficient of expansion and the expansion occurs uniformly without distortion of the instrument.

While there has been shown what is considered at present to be a preferred embodiment of the invention, it will be manifest that many changes and modifications may be made therein without departing from the essential nature of the invention. It is intended therefore in the appended claims to cover all such changes and modifications as fall within the true spirit of the invention.

What is claimed is:

1. In a gyroscopic instrument, an inner gimbal ring, a gyromotor supported within said ring and including a fixed shaft disposed coaxially within said ring and having a stator mounted thereon, a tubular rotor rotatably mounted on said shaft and concentrically disposed intermediate said stator and said ring, whereby said ring forms the casing of said motor, a pair of conical caps enclosing the ends of said ring and having peripheral portions received within circular recesses in said ends, said shaft extending between said caps and being supported thereby, and means to apply compression to said caps tending to flatten same and causing said peripheral portions to press outwardly whereby said caps are tightly held against said ring.

2. In a gyroscopic instrument, an inner gimbal ring, a gyromotor supported within said ring and including a fixed shaft disposed coaxially within said ring and having a stator mounted thereon, a tubular rotor rotatably mounted on said shaft and concentrically disposed intermediate said stator and said ring, whereby said ring forms the casing of said motor, a pair of conical shaped caps enclosing the ends of said ring and having peripheral portions received within circular recesses in said ends, said shaft extending between said caps and being supported thereby, the extremities of said shaft projecting from said caps, and a pair of nuts threadably received on said extremities to apply compression to said caps tending to flatten same and causing said peripheral portions to press outwardly whereby said caps are tightly held against said ring, the above listed elements all being formed of steel.

3. A gyroscopic instrument comprising a main gimbal ring pivotally supported for rotation about a first axis, an inner gimbal ring pivotally supported within said main ring for rotation about a second axis perpendicular to said first axis, a tubular rotor concentrically disposed within said inner ring, a pair of conical caps enclosing the ends of said inner ring, said caps having skirt portions received within circular recesses in said ends, a shaft extending through the central axis of said inner ring, the extremities of said shaft passing through the end caps and being fixedly secured thereto, said rotor being rotatably mounted on said shaft for rotation about said central axis, said central axis being perpendicular to said first and second axes, and nuts threadably received on the extremities of said shaft to apply compression to said caps.

4. A gyroscopic instrument, a frame, a main gimbal ring pivotally supported in said frame for rotation about a first axis, an inner gimbal ring pivotally supported within said main ring for rotation about a second axis perpendicular to said first axis, a tubular rotor concentrically disposed within said inner ring, a pair of conical caps enclosing the ends of said inner ring, said caps having skirt portions received within circular recesses in said ends, a shaft extending through the central axis of said inner ring, the extremities of said shaft passing through the end caps and being fixedly secured threreto, a cylindrical stator fixedly mounted on said shaft, said rotor being rotatably mounted on said shaft for rotation about said central axis, said central axis being perpendicular to said first and second axes, and nuts threadably received on the extremities of said shaft to apply compression to said caps.

5. A gyroscopic instrument, a frame, a main gimbal ring formed of steel and pivotally supported in said frame for rotation about a first axis, an inner gimbal ring formed of steel and pivotally supported within said main ring for rotation about a second axis perpendicular to said first axis, a gyromotor including a tubular steel rotor concentrically disposed within said inner ring, a pair of conical steel caps enclosing the ends of said inner ring, said caps having skirt portions received within circular recesses in said ends, a shaft extending through the central axis of said inner ring, the extremities of said shaft passing through the end caps and being fixedly secured thereto, said rotor being rotatably mounted on said shaft for rotation about said central axis, said central axis being perpendicular to said first and second axes, said inner ring forming the casing of said gyromotor, and steel nuts threadably received on the extremities of said shaft to apply compression to said caps.

6. A gyroscopic instrument comprising a frame constituted by a base, a dome-shaped cage mounted above said base and a head surmounting said cage, a main gimbal ring disposed within said cage and pivotally supported for rotation between said head and said base about a central vertical axis, an inner ring disposed within said main ring and pivotally supported therein for rotation about a horizontal axis intersecting said vertical axis, a gyromotor supported symmetrically within said inner ring and including a central shaft extending through a spin axis perpendicular both to said horizontal and vertical axes, a cylindrical stator fixedly mounted on said shaft, and a tubular rotor concentrically disposed intermediate said stator and said inner ring, a first pair of enclosure caps rotatably mounted on said shaft and secured to the ends of said tubular rotor, a second pair of caps mounted on said shaft and enclosing the ends of said inner ring, said second caps having a conical shape and having a skirt portion received within circular recesses in the ends of said inner ring, and nuts threadably received on the ends of said shaft to compress said second caps.

7. A gyroscopic instrument comprising a frame constituted by a base, a dome-shaped cage mounted above said base and a head surmounting said cage, a main gimbal ring disposed within said cage and pivotally supported for rotation between said head and said base about a central vertical axis, an inner ring disposed within said main ring pivotally supported for rotation about a horizontal axis intersecting said vertical axis, a gyromotor symmetrically supported within said inner ring and including a central shaft extending through a spin axis perpendicular both to said horizontal and vertical axes, a cylindrical stator fixedly mounted on said shaft, and a tubular rotor concentrically disposed intermediate said stator and said inner ring, said inner ring forming the casing of said gyromotor, a first pair of caps rotatably mounted on said shaft and secured to the ends of said tubular rotor, a second pair of caps mounted on said shaft and enclosing the ends of said inner ring, said second caps having a conical shape and having a skirt portion received within circular recesses in the ends of said inner ring, and nuts threadably received on the ends of said shaft to compress said second caps, all of the above listed elements except said frame being formed of high tensile steel.

8. A gyroscopic instrument comprising a frame constituted by a base, a dome-shaped cage mounted above said base and a head surmounting said cage, a shell encasing said frame and provided with a removable cover, a main gimbal ring disposed within said frame and having opposing trunnions for pivotally supporting said main gimbal ring for rotation between said head and said base about a central vertical axis, an inner ring disposed within said main ring and having opposing trunnions for pivotally supporting said inner ring for rotation about a horizontal axis intersecting said vertical axis, a gyromotor symmetrically supported within said inner ring and including a central shaft extending through a spin axis perpendicular both to said horizontal and vertical axes, a cylindrical stator fixedly mounted on said shaft and provided with windings, and a tubular rotor concentrically disposed intermediate said stator and said inner ring, said rotor being internally slotted and having windings therein, a first pair of caps rotatably mounted on said shaft and secured to the ends of said tubular rotor, a second pair of caps fixedly mounted on said shaft and enclosing the ends of said inner ring, said second caps having a conical shape and having a skirt portion received within circular recesses in the ends of said inner ring, and nuts threadably received on the ends of said shaft to compress said second caps.

References Cited in the file of this patent

UNITED STATES PATENTS

| 1,573,028 | Bates | Feb. 16, 1926 |
| 1,866,733 | Tanner | July 12, 1932 |
| 2,720,602 | Dolude | Oct. 11, 1955 |

FOREIGN PATENTS

| 251,389 | Great Britain | May 6, 1926 |